United States Patent
Erkfritz

[15] 3,701,187
[45] Oct. 31, 1972

[54] SLOTTING CUTTER AND INDEXABLE INSERTS THEREFOR

[72] Inventor: Donald S. Erkfritz, Rockford, Ill.

[73] Assignee: The Ingersoll Milling Machine Company, Rockford, Ill.

[22] Filed: Dec. 15, 1970

[21] Appl. No.: 98,235

[52] U.S. Cl. .................................29/95, 29/105
[51] Int. Cl. ...........................B26d 1/00, B26d 1/12
[58] Field of Search..........29/95, 96, 105, 105 A, 97, 29/98

[56] References Cited

UNITED STATES PATENTS 3,188,717  6/1965  Heinlein........................29/96

FOREIGN PATENTS OR APPLICATIONS

1,502,096  8/1969  Germany................29/105 A
1,905,038  8/1970  Germany................29/105 A
237,409  4/1964  Austria........................29/105

Primary Examiner—Harrison L. Hinson
Attorney—Wolfe, Hubbard, Leydig, Voit & Osann, Ltd.

[57] ABSTRACT

Ribbed cutting inserts providing scalloped cutting edges are spaced angularly around the periphery of a supporting disk and are staggered relative to one another along the axis of the disk to remove laterally spaced chips from the bottom of the slot while the sides of the slot are face milled by side cutting inserts spaced angularly from the ribbed inserts.

20 Claims, 30 Drawing Figures

PATENTED OCT 31 1972 3,701,187

INVENTOR.
DONALD S. ERKFRITZ
BY Wolfe, Hubbard, Leydig, Voit & Osann
ATTORNEYS.

SLOTTING CUTTER AND INDEXABLE INSERTS THEREFOR

BACKGROUND OF THE INVENTION

This invention relates to a cutter of the type comprising a rotary disk-like body and blades spaced angularly around the periphery of the body. The invention has more particular reference to a slotting cutter in which the blades include generally radially extending edges set out from opposite sides of the disk for milling the opposed side walls of the work slot and central or main edges extending transversely of the disk periphery for removing the intervening work material across the slot bottom as the workpiece and the cutter are fed relative to one another.

SUMMARY OF THE INVENTION

The primary object of the present invention is to provide a cutter of the above general character which is capable of achieving a higher rate of material removal than has been possible heretofore while employing blades in the form of inserts adapted for selective indexing on the disk into a plurality of cutting positions. This objective is achieved by utilizing, as the main cutting edges of the ultimate cutter, scalloped edges presented along the four end edges of a rectangular block-like insert and formed as a result of grooving the upper and lower sides of the block, the scalloped edges being effective to remove separate chips spaced laterally across the bottom of the slot. As a result, the width of the chips is reduced to lower the cutting pressure and the generated heat as the edges move through the work, to facilitate better compaction of the chips in the chip-receiving gullets of the disk and to enable the storage of more chips in the gullets so that the cutter can be fed into the work at a faster rate without encountering interference from the accumulating chips. Preferably, adjacent inserts are mounted in different axial positions on the disk to axially stagger the scalloped cutting edges of successive inserts relative to one another so that part of the work material left by one insert is removed by the succeeding insert or inserts.

A further object of the invention is to provide on the cutter, in addition to the scalloped inserts, separate inserts formed with generally radially extending cutting edges for milling the side walls of the slot, the side cutting inserts being set out axially on opposite sides of the scalloped inserts and automatically establishing the necessary axial clearance between the scalloped inserts and the side walls of the slot.

The invention also resides in the novel construction of the scalloped inserts themselves in contributing to the foregoing, in the mounting of the scalloped inserts on cartridges which are uniquely constructed to support the inserts with optimum rigidity according to the forces exerted on the inserts, and in the novel pairing of two side cutting inserts on a single cartridge to balance the forces imposed on the cartridge as the inserts mill the opposite side walls of the slot.

These and other objects and advantages of the invention will become apparent from the following detailed description when taken in connection with the accompanying drawings.

DETAILED DESCRIPTION OF THE PREFERRED EMBODIMENTS

While the invention is applicable to various types of cutters, it is particularly useful in a slotting cutter 35 for forming an elongated slot 36 in a metal workpiece 37 and therefore is shown and will be described in such a cutter.

Figures 1, 2, 3, 4:
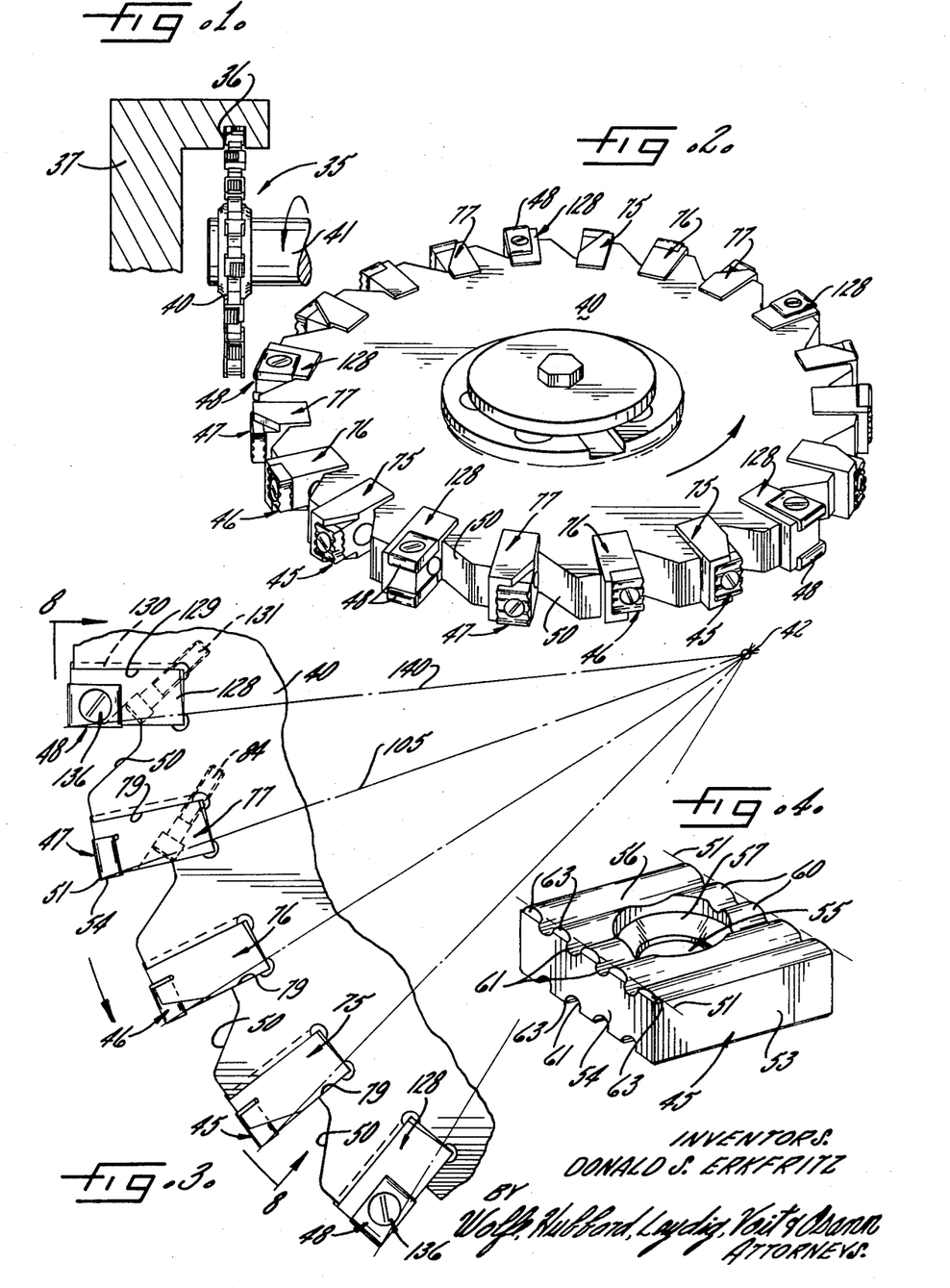
FIG. 1 is an elevational view of a new and improved cutter embodying the novel features of the present invention and showing the cutter forming a slot in a workpiece.
FIG. 2 is an enlarged perspective view of the cutter shown in FIG. 1.
FIG. 3 is an enlarged fragmentary plan view of the cutter shown in FIG. 2.
FIG. 4 is a perspective view of one of the scalloped inserts.

Referring first to FIGS. 1 to 3, the cutter is shown to include a disk-like body 40 centrally apertured for mounting on the end of a spindle 41 to rotate about a central axis 42 and adapted when rotated and fed edgewise along the workpiece 37 (as indicated by the arrows in FIG. 2) to remove successive layers of metal and form the slot 36. Removal of the metal along the bottom 43 (FIG. 9) and the sides 44 of the slot is effected by angularly spaced groups of flat wafer-like blades or inserts located around the periphery of the disk, each group of inserts of the cutter shown specifically in FIGS. 1 to 3 including inserts 45, 46 and 47 spaced successively from one another around the circumference of the disk and further including a pair of inserts 48 spaced angularly from and trailing the insert 47. Each of the inserts is supported adjacent the peripheral edge of the disk at the trailing end of a radially extending chip clearance recess or gullet 50 (FIGS. 2 and 3) formed through the disk to receive the chips shaved from the slot by the insert and to store the chips until the insert rotates downwardly out of the slot and slings the chips clear of the slot.

In accordance with one aspect of the present invention, the inserts 45, 46 and 47 of each group are each formed with scalloped cutting edges 51 and each are located in different axial positions on the disk 40 thereby to axially stagger the successive cutting edges so that each insert removes comparatively narrow chips spaced laterally across the bottom 43 of the slot 36. Moreover, the inserts 48 of each group coact in a novel manner with the scalloped inserts to remove narrow chips from the opposite sides 44 of the slot and thereby establish the necessary axial clearance between the scalloped inserts and the sides of the slot.

In the slotting cutter illustrated, the scalloped inserts 45, 46 and 47 are precisely identical to one another and each is formed from a rectangular block of suitable cutting material such as tungsten carbide. As exemplified by the insert 45 shown in FIGS. 4 to 7, each scalloped insert comprises flat parallel side faces 53 and parallel end faces 54 which are also flat and disposed perpendicular to the side faces. A center hole 55 extends through the insert between the upper and lower sides 56 thereof and in the present instance is recessed at both ends to form upper and lower frusto-conical seats 57 whose axes 59 coincide and are disposed precisely perpendicular to the upper and lower sides 56 and precisely parallel to the side faces 53 and the end faces 54.

Figures 5, 6, 7, 9:
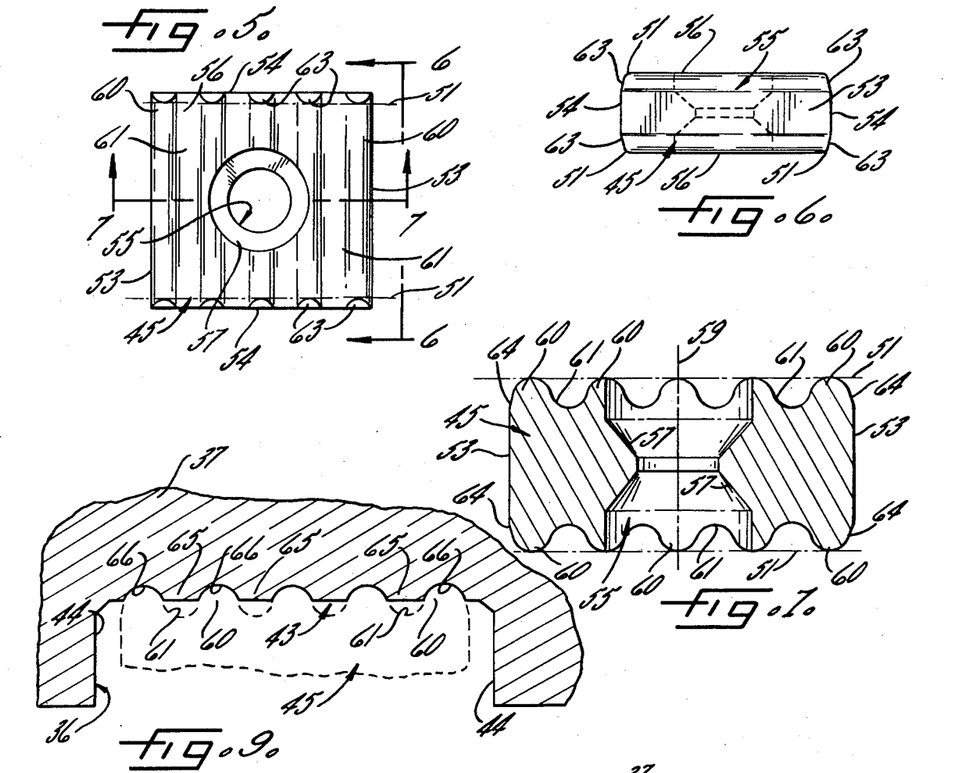
FIGS. 5 and 6 are a plan view and a side elevation, respectively, of the insert shown in FIG. 4, FIG. 6 being taken along the line 6—6 of FIG. 5.
FIG. 7 is an enlarged cross-section taken along the line 7—7 of FIG. 5.
FIGS. 9 to 12 are cross-sections taken through the workpiece and illustrate the progressive steps occuring during cutting of the slot.

Formation of the scalloped cutting edges 51 on each of the inserts 45, 46 and 47 is effected by forming parallel ribs 60 and intervening grooves 61 (FIGS. 4 to 7) across both the upper and lower sides 56 of the insert, the ribs and grooves extending transversely of the axis 59 of the hole 55 and extending parallel to the side faces 53 from one end face 54 to the opposite end face. As a result of the ribs and grooves alternating with one another across the sides 56, a scalloped cutting edge 51 is defined along each of the four junctions of the sides 56 with the end faces 54, and correspondingly scalloped cutting faces 63 are defined by the extreme end surfaces of the ribs. The cutting edge 51 may be strengthened by bevelling the cutting face 63 relative to the adjacent end face 54 and side 56 as shown in FIGS. 4 and 6. Preferably, the tips or crests of the ribs 60 and the bottoms of the grooves 61 are rounded as shown in FIG. 7 so that each of the scalloped cutting edges is shaped generally as a sinusoid. Also, the location and spacing of the ribs and grooves on the upper and lower sides 56 of the insert are identical in that the crests of the upper ribs directly overlie the crests of the lower ribs and are disposed in parallel planes extending perpendicular to the insert and through the crests of the lower ribs. The outboard flank of each outboard rib 60 is beveled at 64 (see FIG. 7) and thus merges gradually with the adjacent side face 53 rather than defining a sharp-edged corner at its junction with the side face.

Each of the scalloped inserts 45, 46 and 47 is supported on the disk 40 with its ribs 60 and grooves 61 extending generally tangentially of the periphery of the disk and with one of its four cutting edges 51 disposed in leading relationship and extending transversely of the disk periphery. In keeping with the invention, the three inserts 45, 46 and 47 of each group are located in different axial positions on the disk periphery so that the ribs 60 of each insert are staggered or displaced axially with respect to the ribs of both the preceding and succeeding insert. Thus, as shown in FIG. 8 and FIGS. 9 to 11, the first scalloped insert 45 of the group is centered transversely on the periphery of the disk and is centered with respect to the side walls 44 of the slot 36, the second insert 46 is offset to the left of the first insert by a distance equal to approximately one-third of the lateral pitch of the ribs 61, and the third insert 47 is offset to the right of the first insert by a corresponding distance.

Each time the first scalloped insert 45 of each group proceeds through the slot 36, the tips and both adjacent flanks of the leading ends of the ribs 60 cut along the bottom 43 of the slot to remove laterally spaced chips from the bottom and thereby form alternating hills 65 and valleys 66 across the bottom (see FIG. 9). At the rates at which the cutter is normally fed, each rib cuts only to partial depth instead of down to the extreme bottoms of the adjacent grooves 61 and thus the lateral width of each chip removed is somewhat less than the width of the root of the rib. Each rib does, however, cut symmetrically across its tip or crest from one flank to the other and thus the laterally directed side thrust exerted on each flank is balanced by the oppositely directed side thrust exerted on the opposite flank so that the only substantial thrust exerted on the insert 45 is directed rearwardly of the insert and generally tangentially of the disk 40.

Figures 10, 11:
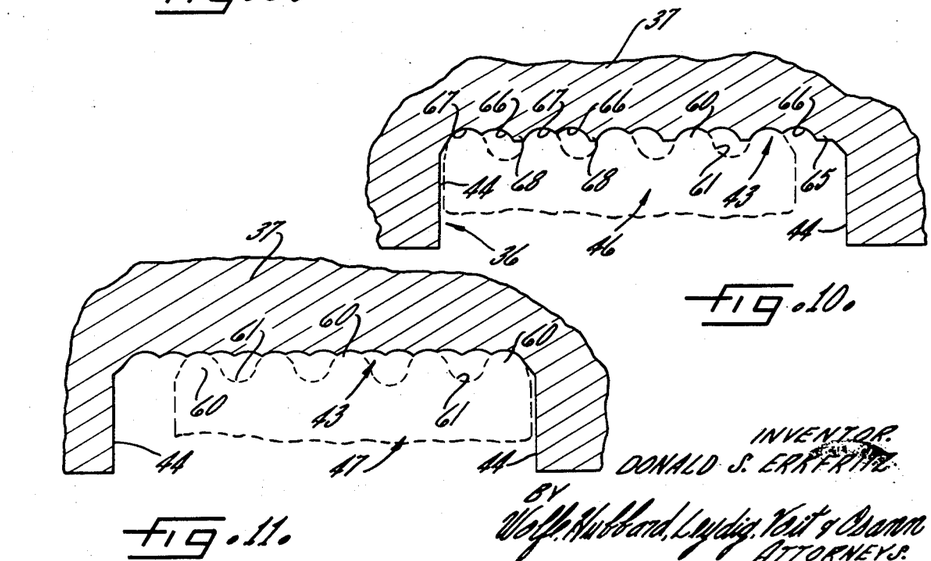
Figure 15:
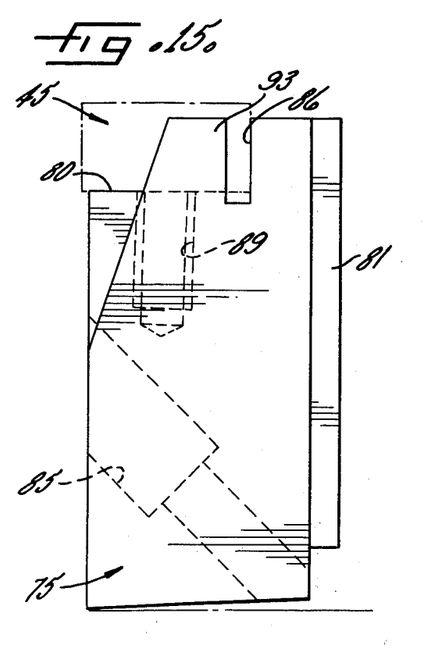

The second scalloped insert 46 follows the first insert 45 through the slot 36 and, as an incident thereto, the ribs 60 of the second insert cut away part of the hills 65 left in the bottom 43 of the slot by the first insert and thus form in the slot bottom additional valleys 67 separated by narrower hills 68 (see FIG. 10). Because the second insert 46 is staggered to the left relative to the first insert 45, the left sides of the hill 65 are cut away primarily by the crests and the left flanks of the ribs 60 of the second insert while portions of the right flanks simply pass through the previously cut valleys 66 without removing any metal. Accordingly, the chips removed by the ribs 60 of the second insert 46 are somewhat narrower than those removed by the ribs of the first insert 45 and, in addition, a rightwardly directed side thrust is exerted on the second insert as a result of the cutting pressure on the left flanks of the ribs being greater than the cutting pressure on the right flanks. Thus, the second insert 46 of each group is forced to the right (FIGS. 8 and 10) as well as being forced rearwardly by virtue of the engagement of the ribs 60 with the hills 65 in the bottom 43 of the slot 36.

As the third insert 47 proceeds through the slot 46, the ribs 60 thereof, being staggered to the right relative to the ribs of the first and second inserts 45 and 46, cut away the hills 68 left by the second insert 46 (see FIG. 11) and remove still narrower chips spaced laterally across the slot. As the hills 68 are cut away, the cutting pressure is distributed uniformly and symmetrically across the crest, and opposite flanks of most of the ribs 60 of the third insert 47 since the ribs are substantially centered between adjacent hills. The right flank, however, of the extreme right rib 60 of the insert 47 engages the side of the adjacent hill 65 to the right while a large portion of the left flank of such rib simply passes through the adjacent valley 66 to the left without engaging any metal. As a result, a leftwardly directed side thrust is exerted on the third insert 47 in addition to the normal thrust tending to force the insert rearwardly.

From the foregoing, it will be apparent that the major width of the bottom 43 of the slot 36 is cut away by the action of the three successive scalloped inserts 45, 46 and 47 and that each removes comparatively narrow chips spaced laterally across the slot. Because the chips are thus broken up, less heat is generated as the metal is removed and less force is required to move each insert through the slot. In addition, the narrow chips bend easily and are easily compressible into a compact mass so that a greater volume of chips can be stored in the chip-receiving gullets 60 than is the case with wider and less readily compactible chips. Accordingly, the cutter can be fed to greater depths at faster speeds as a result of being free from interference with the chips accumulating in the gullets and this, in conjunction with the reduction in the heat generated during cutting, enables removal of the metal at higher rates.

Novel means are provided for supporting and locating the inserts 45, 46 and 47 of each group in different axial positions on the disk 40 and, at the same time, for supporting the inserts in an optimum manner to best sustain the differently directed thrust forces exerted on the different inserts during cutting of the slot 36. Herein, these means comprise cartridges 75, 76 and 77 (FIGS. 2, 3 and 13 to 21) for supporting the inserts 45, 46 and 47, respectively, and adapted to be secured detachably to the disk 40 within recesses 79 (FIG. 3) located just rearwardly of the gullets 50. As shown in FIGS. 13 to 21, each cartridge comprises a block-like member of rectangular cross-section and is formed with a generally flat platform 80 which extends tangentially of the disk 40 and upon which the insert is supported. A key 81 formed on the trailing wall of the cartridge fits into a keyway 83 (FIG. 8) cut in the rear wall of the recess 79 to locate the cartridge accurately in the recess while a screw 84 (FIG. 3) extending through a hole 85 in the cartridge and threaded into a hole in the disk 40 anchors the cartridge securely in place in the recess although other means could be used to secure the cartridge in place.

Figure 16:
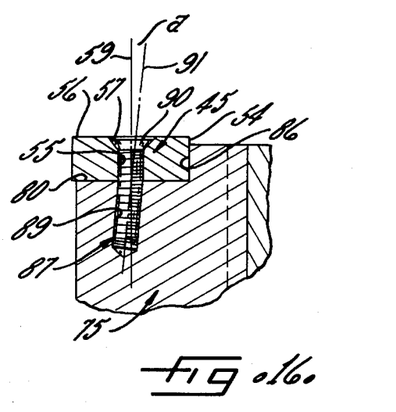
FIG. 16 is a reduced fragmentary cross-section taken along the line 16—16 of FIG. 8.

As shown in FIGS. 13 to 16, a wall 86 is formed at the trailing end of the platform 80 of the cartridge 75 for the leading insert 45 and defines an abutment against which the insert is crowded edgewise and rearwardly. Preferably, edgewise crowding of the insert 45 against the abutment 86 is effected in the manner disclosed in my copending application Ser. No. 17,605, filed Mar. 9, 1970, and involves the use of a screw 87 (FIG. 16) which also serves to clamp the insert securely against the platform 80. The screw is threaded into a generally upright hole 89 at the center of the platform 80 and includes a frustoconical head 90 adapted to seat fully as shown in FIG. 16 in one of the complemental seats 57 formed in the insert 45 at opposite ends of the center hole 55. The screw 87 is tightened by a tool inserted in a socket in the flat end of the head 90 which is disposed somewhat below the surrounding side 56 of the insert 45 when the head is fully seated as shown in FIG. 16.

The outer end of the axis 91 of the screw hole 89 in the cartridge 75 is tilted at an angle *a* (FIG. 16) of a few degrees toward the abutment 86 while the axis 59 of the conical seats 57 in the insert 45 are perpendicular to the plane of the insert and the platform 80. Thus, as the screw 87 is tightened to draw the head 90 into the outer seat 57 (FIG. 16), the conical surface of the head cams the insert edgewise and rearwardly toward the abutment 86. To allow full seating of the screw head 90, the shank of the screw 87 is weak enough to bend as shown in FIG. 16 and force the trailing end 54 of the insert 45 to come into face-to-face engagement with the abutment 86 as the screw head comes into full face-to-face engagement with the conical seat 57. Because the insert 45 is forced directly rearwardly against the abutment 86 by the screw 87, the abutment backs the insert rigidly and sustains the rearwardly directed thrust exerted on the insert during cutting. The particular inclination of the screw hole 89 toward the abutment 86 causes the head 90 to cam the insert 45 rearwardly and, in addition, results in the screw 87 bending in a direction alined with the rearwardly directed thrust exerted on the insert. To insure against any sidewise movement of the insert 45 should the screw 87 happen to loosen, comparatively narrow abutments 93 (FIG. 13) are formed at the sides of the platform 80 of the cartridge 75 and closely engage the side faces 53 of the insert.

Figures 8, 12, 13, 14:
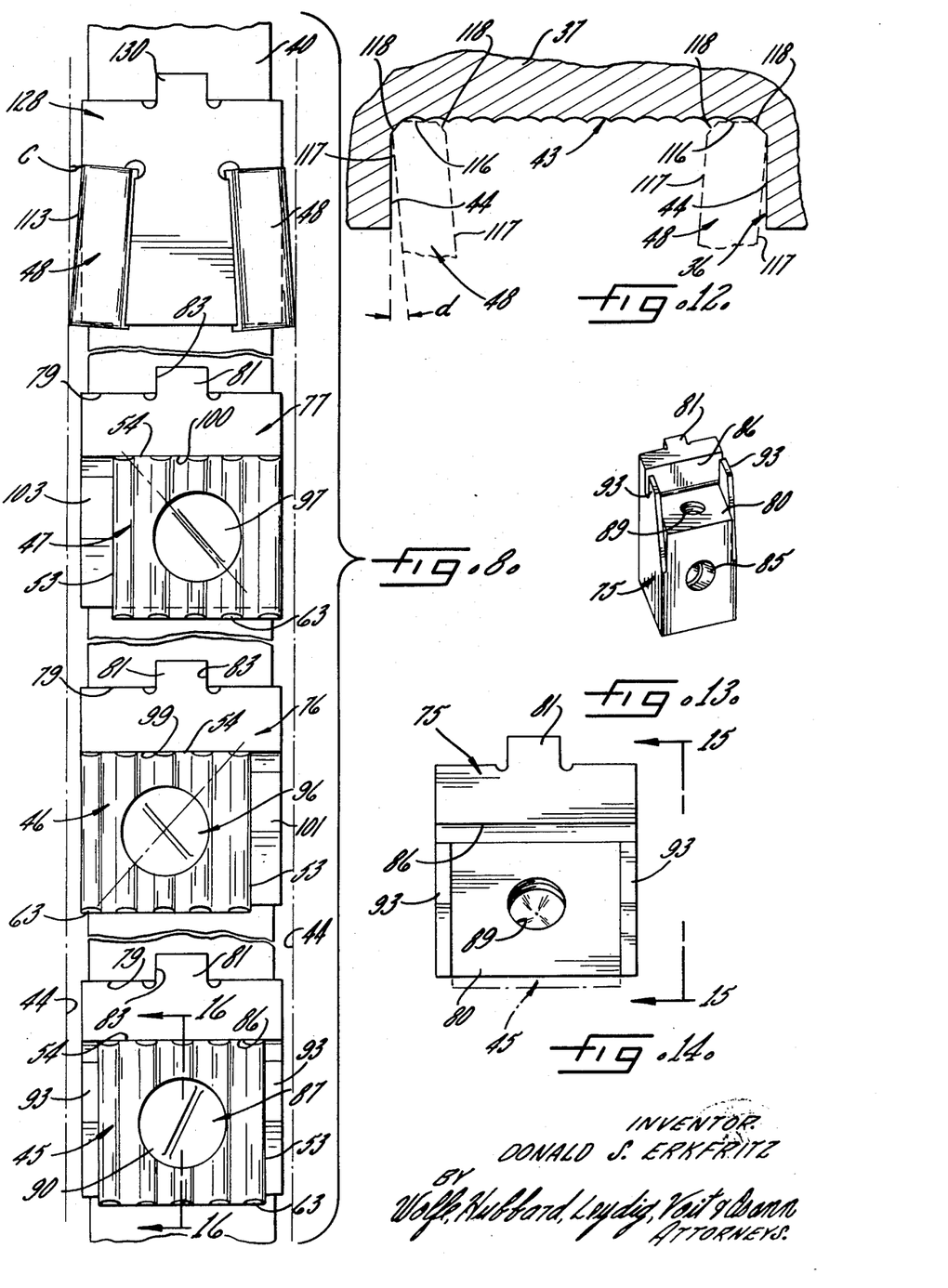
FIG. 8 is an enlarged roll-out view of the edge of the cutter shown in FIG. 3 and is taken along the line 8—8 of FIG. 3.
FIG. 13 is a perspective view of a first type of cartridge for supporting certain of the scalloped inserts.
FIGS. 14 and 15 are an enlarged plan view and an enlarged side elevation, respectively, of the cartridge shown in FIG. 13, FIG. 15 being taken along the line 15—15 of FIG. 14.

As illustrated in FIGS. 8 and 14, the screw hole 89 is centered transversely with respect to the platform 80 of the cartridge 75 which, in turn, is centered transversely with respect to the disk 40 so that the first insert 45 is located in a centered position on the disk. The overall outside length, width and height of the cartridges 76 and 77 for the second and third inserts 46 and 47 are identical to the corresponding outside dimensions of the cartridge 75 but the threaded holes 94 and 95 formed through the platforms 80 of the cartridges 76 and 77, respectively, are offset to the left and right, respectively, of the hole 89 in the cartridge 75. As a result, the second and third inserts 46 and 47, when fastened to the platforms by screws 96 and 97 (FIG. 8), are displaced along the cutter axis to the left and the right, respectively, of the first insert 45. Thus, the ribs 60 of the three inserts are staggered axially relative another in this instance by virtue of the offset relation of the screw holes 89, 94 and 95 causing the inserts to be located in different physical positions along the axis of the disk 40.

Figure 17:
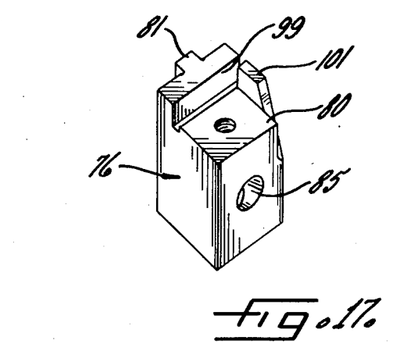
FIGS. 17, 18 and 19 correspond to FIGS. 13, 14 and 15, respectively, but show a second type of cartridge for supporting certain other ones of the scalloped inserts, FIG. 19 being taken along the line 19—19 of FIG. 18.
Figure 18:
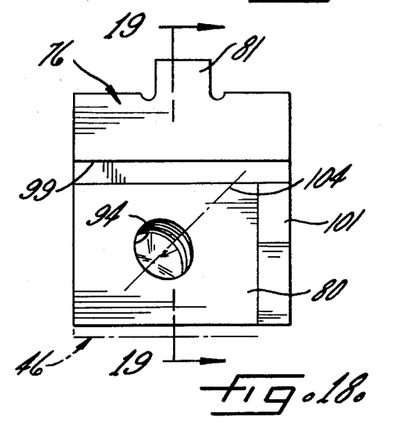
Figure 19:
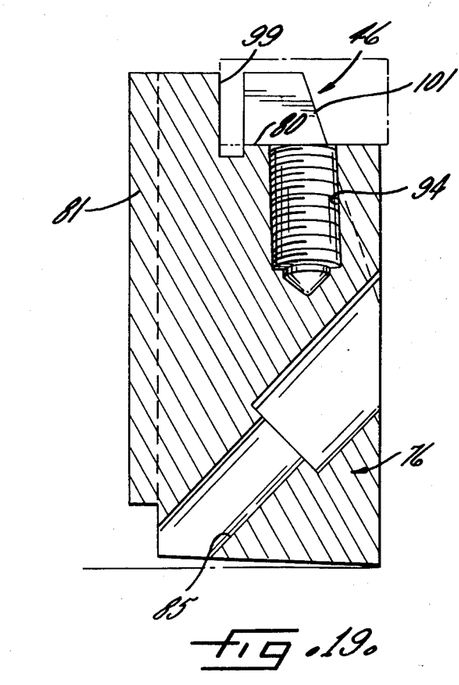
Figures 20, 21, 22, 23, 24, 27:
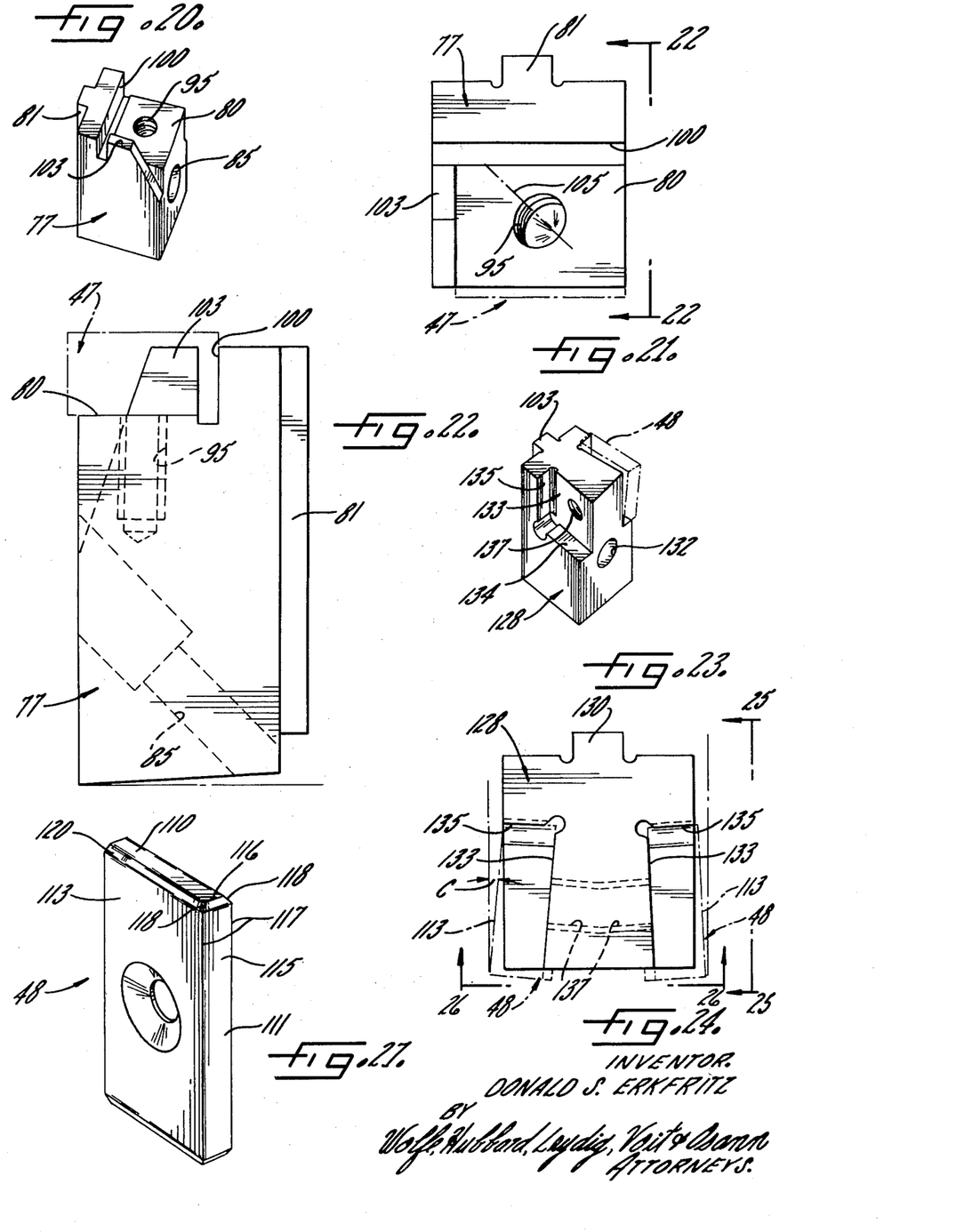
FIGS. 20, 21 and 22 also correspond to FIGS. 13, 14 and 15, respectively, but show a third type of cartridge for supporting still other ones of the scalloped inserts, FIG. 22 being taken along the line 22—22 of FIG. 21.
FIGS. 23 and 24 correspond to FIGS. 13 and 14, respectively, but show a cartridge for supporting the side cutting inserts.
FIGS. 27, 28 and 29 are respectively a perspective view, a plan view and a side elevation of one of the side cutting inserts, FIG. 29 being taken along the line 29—29 of FIG. 28.
Figure 25:
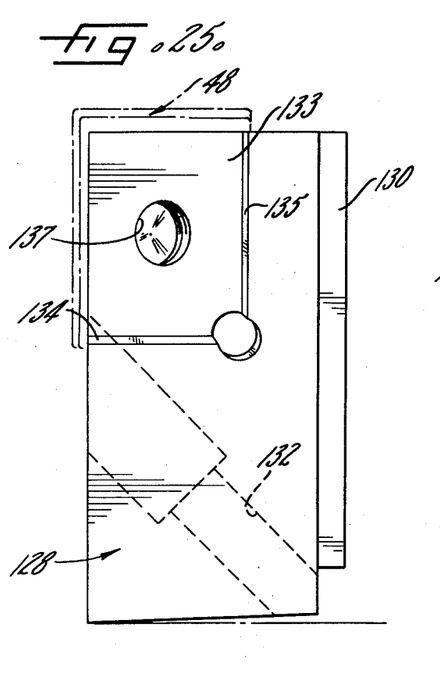
FIGS. 25 and 26 are taken along the lines 25—25 and 26—26, respectively, of FIG. 24 and are elevational views of the cartridge for the side cutting inserts.

As in the case of the cartridge 75, transversely extending abutments 99 and 100 are formed at the trailing ends of the platforms 80 of the cartridges 76 and 77, respectively (see FIGS. 17 and 20). In addition, however, a second abutment 101 formed along the right side of the platform 80 of the cartridge 76 coacts with the trailing abutment 99 to define a right angular corner opening generally toward the left (FIG. 8) while an additional abutment 103 formed along the left side of the platform 80 of the cartridge 77 coacts with the trailing abutment 100 to define a right angular corner opening generally toward the right. The inserts 46 and 47 are crowded edgewise into the corners on the platforms 80 of the cartridges 76 and 77, respectively, by forcing the inserts substantially diagonally across the platforms. For this purpose, the outer end of the axis 104 (FIG. 18) of the screw hole 94 is inclined rearwardly and toward the corner between the abutments 99 and 101 while the outer end of the axis 105 (FIG. 21) of the screw hole 95 is inclined rearwardly and toward the corner between the abutments 100 and 103. Thus, when the screw 96 is tightened, the insert 46 is cammed substantially diagonally to the right into pressing engagement with each of the abutments 99 and 101 and, by the same token, the insert 47 is cammed substantially diagonally to the left against the abutments 100 and 103 when the screw 98 is tightened. The rear abutment 99 and the right abutment 101 locate and rigidly back the adjacent end face 54 and side face 53 of the insert 46 and sustain the rearwardly and rightwardly directed thrust imposed on that insert during cutting of the slot as shown in FIG. 10. Similarly, the rear abutment 100 and the left abutment 103 locate the insert 47 and back the insert against the rearwardly and leftwardly directed thrust imposed thereon as the insert removes the metal as shown in FIG. 11.

As pointed out above, all of the cartridges 75, 76 and 77 have identical outside dimensions and all are generally similar in outside shape. In addition, all of the keyways 83 in the disk 40 and all of the keys 81 on the different cartridges are centered on a common plane paralleling the plane of rotation of the disk 40 (see FIG. 8). Thus, all of the keyways 83 and corresponding cartridge-receiving recesses 79 can be formed in the disk 40 by an identical operation and with identical tooling and yet the inserts 45, 46 and 47, when supported on the disk by the cartridges, are staggered axially relative to one another by virtue of the different locations of the screw hole 89, 94 and 95 in the platforms 80 of the cartridges and by virtue of the different locations of the locating abutments on the platforms of the various cartridges. Also, because of the different inclinations of the screw holes and the different arrangement of the various abutments, each insert is best supported and backed in accordance with the direction of the thrust imposed on the insert during cutting.

In the cutter shown, the leading end face 54 of each of the inserts 45, 46 and 47 is offset ahead of a radius 105 (FIG. 3) of the disk 40 extending through the effective cutting edge 51 so as to locate the leading cutting face 63 at a negative rake angle and thus provide the necessary radial clearance between the upper side of the insert and the bottom 43 of the slot 36. It will be seen in FIG. 8 that the leading cutting face 63 of each of the inserts 45, 46 and 47 is located in a plane precisely perpendicular to the plane of the disk 40 and thus is disposed at a shear angle of 0°. This, together with the generally tangentially extending ribs 60 and grooves 61, results in the chips cut from the slot 36 being directed parallel to the rotational plane of the disk rather than being skewed sidewise against one of the sides 44 of the slot.

Advantageously and in keeping with the invention, the pair of inserts 48 of each group face mill the opposite sides 44 of the slot 36 and establish axial clearance between the sides of the slot and the side faces 53 of the scalloped inserts 45, 46 and 47 so that it is not necessary, in order to provide such clearance, either to incline the side faces 53 relative to the end faces 54 or to skew the scalloped inserts on the disk 40 with the side faces inclined relative to the sides of the slot. As a result, the side faces 53, and end faces 54 and the sides 56 of each scalloped insert may be made mutually perpendicular as illustrated so that each insert may be provided with four symmetrically disposed cutting edges 51 which may be presented into cutting position simply by indexing the insert end-for-end and/or by inverting the insert so that its opposite side 56 is clamped against the platform 80.

More particularly, each of the side cutting inserts 48 comprises a thin and generally rectangular wafer disposed on the disk 40 in a generally upright plane (FIG. 12) and formed with upper and lower end faces 110 (FIGS. 27 to 30), leading and trailing parallel side faces 111, and left and right sides 113 which are flat and smooth. The two side cutting inserts 48 of each group are paired with one another at the same angular location on the disk 40 and are located axially on the disk such that the left side portion of the left insert 48 (FIG. 8) is disposed to the left of the second scalloped insert 46 of the group while the right insert 48 is disposed to the right of the third scalloped insert 47. The side cutting inserts 48 thus are set out from opposite sides of the disk 40 and are located to cut the side walls 44 of the slot 36 and also the outboard margins of the bottom wall 43 thereby to prevent any rubbing contact between the sides of the slot and the left side face 53 of the second insert 46 and the right side face of the third insert 47.

As shown in FIG. 27, a cutting face 115 is defined adjacent the junction of each end face 110 with each side face 111 and includes a horizontal cutting edge 116, two vertical cutting edges 117, and two oppositely inclined cutting edges 118 extending between the horizontal and vertical edges and formed by radiusing or bevelling each side 113 of the insert inwardly toward the adjacent end face 110 as indicated at 120. The side cutting inserts 48 are located radially on the disk 40 such that the upper horizontal cutting edges 116 thereof are set just slightly below or inwardly of the leading cutting edges 51 of the scalloped inserts 45, 46 and 47. (see FIG. 12) Thus, as each pair of side cutting inserts 48 of each group follows the third insert 47 through the slot 36, the inboard portions of the cutting edges 116, 117 and 118 overlap the paths followed by the scalloped inserts and simply proceed through the slot without cutting any metal (see FIG. 12). The outboard portion of the horizontal cutting edge 116 of each insert 48, however, coacts with the outboard inclined edge 118 to cut away the outer margin of the slot bottom 43 and, at the same time, each outboard vertical edge 117 wipes across and cleans up the adjacent side 44 of the slot. Thus, the side cutting inserts remove the metal from the side portions of the slot with a face milling action and establish axial clearance between the slot sides 44 and the side faces 53 of the scalloped inserts so that the side faces can be located parallel to the slot sides as shown in FIG. 8.

For supporting each pair of side cutting inserts 48 on the disk 40, a cartridge 128 (FIGS. 23 to 26) is fitted into a recess 129 (FIG. 2) located rearwardly of the third scalloped insert 47, the cartridge being located in the recess by a key 130 and being held by a screw 131 extending through a hole 132 in the cartridge. Generally radially extending platforms 133 are milled into each upright side of the cartridge and each is bounded on its lower and trailing sides by lower and trailing abutments 134 and 135 which define a generally upwardly facing right angular corner. Each side cutting insert 48 is clamped to one of the platforms 133 and is crowded edgewise into its respective corner and against the abutments 134 and 135 by a screw 136 (FIG. 3) which is threaded into a hole 137 (FIGS. 23 to 26) formed in the platform and having an axis whose outer end is inclined toward the corner so that the screw will cam the insert rearwardly and toward the corner and then bend during final tightening.

Figure 26:
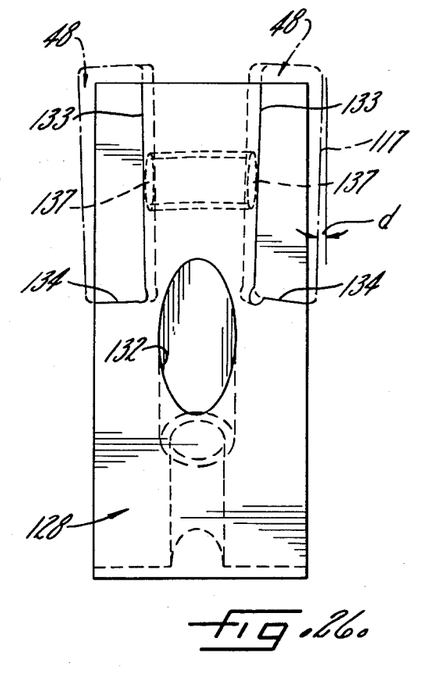
Figure 28:
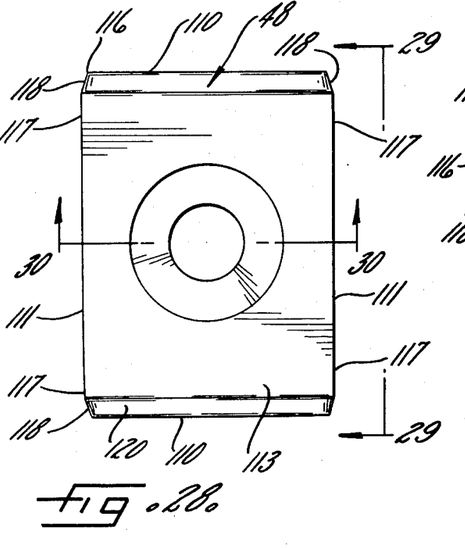
Figure 29:
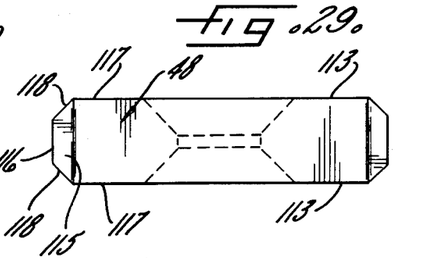
Figure 30:
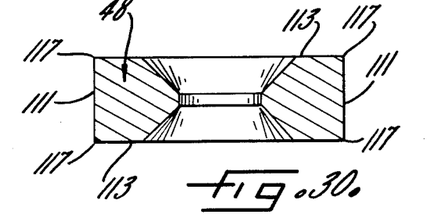
FIG. 30 is a cross-section taken along the line 30—30 of FIG. 28.

The platforms 133 of each cartridge 128 are inclined so that their leading ends flare away from one another as shown in FIG. 24 to cause the outboard sides 113 of the inserts 48 to be inclined at an axial rake angle $c$ (FIGS. 8 and 24). In addition, the upper ends of the two platforms flare away from one another (see FIG. 26) so that each outboard vertical cutting edge 117 is inclined vertically at a dish angle $d$ (FIGS. 12 and 26). The upper end face 110 of each side cutting insert 48 is provided with radial clearance relative to the slot bottom 43 by locating the leading side face 111 of the insert ahead of a radius 140 (FIG. 4) extending through the leading horizontal cutting edge 116. Accordingly, the side cutting inserts are located properly on the disk 40 to face mill the side portions of the slot as described previously. By indexing and inverting the inserts 48, four different cutting edges 116 and eight different sets of edges 117 and 118 may be presented into cutting position. Because each cartridge 128 carries two symmetrically positioned inserts 48 which cut simultaneously on opposite sides of the slot, the side forces exerted on the cartridge are balanced and thus the cartridge is subjected only to a rearwardly directed force.

I claim as my invention:

1. A slot forming cutter having, in combination, a body in the form of a rotary circular disk having chip clearance recesses opening outwardly from and spaced angularly around the disk periphery, a tangentially extending platform adjacent the trailing end of each recess for supporting a cutting insert and having a threaded hole, a radially disposed backing abutment at the trailing end of said platform, a plurality of indexable inserts of identical construction comprising centrally apertured rectangular blocks of cutting material, one seated on each of said platforms and each crowded against the respective abutment by a screw extending through said insert hole and tightened into said threaded hole, each of said inserts thus secured to said disk having one side comprising a plurality of grooves and intervening ribs paralleling the plane of said disk and providing at their leading ends a cutting face and a scalloped cutting edge for removing from a workpiece separate chips spaced laterally across the slot to be formed and cut from the work by the crest portions of the scallops of said cutter edges, a plurality of second insert platforms angularly spaced around said disk and trailing the respective ones of said first platforms, inserts identical with said first inserts similarly seated on said second platforms, the screw holes in the said second platforms being offset axially from the screw holes in said first platforms so that the cutting faces on the leading ends of the ribs of said second inserts remove the material from the adjacent scallop of work material left by the passage of the corresponding first cutting faces, and means secured to said disk and providing pairs of cutting edges angularly spaced around the disk from said first and second inserts and operating during rotation of the disk to face mill the side walls of the slot cut in each pass of said inserts through the work material.

2. A slot forming cutter as defined in claim 1 including a third set of insert platforms similar to said first and second platforms, inserts identical with said first and second inserts similarly seated on the third platforms, the screw holes of said second and third sets of platforms being respectively equidistantly spaced from and disposed on the opposite sides of the said first screw holes.

3. A slot forming cutter as defined in claim 1 in which the trailing ends of the ribs of said inserts form cutting faces identically located in the same positions as said first cutting faces when the inserts are turned end for end.

4. A slot forming cutter as defined in claim 1 in which an identically formed and located set of parallel ribs is formed on the other side of each of said inserts so that by inverting the insert and turning the same end for end, four scalloped cutting edges and sets of cutting faces are presented in cutting position.

5. A slot forming cutter defined in claim 1 in which each of said face milling cutting edges comprises a flat rectangular insert lying against one side of said disk and having a central hole with a screw extending therethrough and threading into a hole in said disk, angularly related abutments outstanding from and normal to said disk side and defining a corner for locating said face milling insert in cutting position, the axis of said disk hole being inclined relative to said insert hole so as to crowd said face milling insert into said corner as the screw is tightened.

6. A cutting tool for forming a slot in a workpiece and comprising, in combination, a body in the form of a rotary disk having a plurality of angularly spaced sets of angularly spaced platforms around its periphery, an insert for cutting the bottom of the slot supported on at least one platform of each set, each of said inserts having at least one side formed with a plurality of parallel ribs and intervening grooves extending generally tangentially of said disk and providing at their leading ends a cutting face and a scalloped cutting edge for removing laterally spaced chips from the bottom of the slot, and a pair of side cutters supported by at least two platforms of each set and providing cutting edges spaced angularly from the insert of the set and positioned to face mill the side walls of the slot.

7. A cutting tool as defined in claim 6 in which a plurality of angularly spaced inserts are supported on the platforms of each set, adjacent inserts on the platforms of each set being supported in different physical positions along the axis of said disk thereby to axially stagger the ribs of each insert relative to the ribs of the immediately succeeding insert.

8. A cutting tool as defined in claim 7 including a threaded hole formed in each of the insert-supporting platforms, a centrally located hole formed in each of said inserts, a screw extending through the hole in each insert and threaded into the hole of the respective platform to anchor the insert to the platform, and the holes in adjacent platforms being spaced from one another along said axis to locate adjacent inserts in different physical positions along the axis and thereby effect axial staggering of said ribs.

9. A cutting tool as defined in claim 8 in which said inserts are rectangular, said disk further including a radially disposed backing abutment at the trailing end of each insert-supporting platform, a second abutment at one side of at least some of said insert supporting platforms and cooperating with the trailing abutment to define a right angular corner, the screw for at least one insert of each set being inclined in a direction to force the insert rearwardly against said trailing abutment in a direction generally tangentially of said disk, the screw for at least one other insert of each set being inclined in a direction to force such insert generally diagonally into said corner.

10. A cutting tool as defined in claim 8 in which said inserts are rectangular, a radially disposed backing abutment formed at the trailing end of each of the insert-supporting platforms of each set, the screw for the insert on a first one of said platforms being inclined in a direction to force the insert rearwardly against the abutment of the platform in a direction generally tangentially of said disk, an additional abutment formed at one side of a second one of the insert-supporting platforms of each set and at the opposite side of a third one of the insert-supporting platforms of each set, said additional abutments coacting with said backing abutments to define right angular corners on said second and third platforms with the corners on the second platforms being located near one side of the disk and with the corners on the third platforms being located near the opposite side of the disk, and the screws for the inserts on the second and third platforms being inclined to force the inserts diagonally into crowding engagement with the respective corners.

11. A cutting tool as defined in claim 10 in which said insert-supporting platforms are formed on cartridges received within angularly spaced recesses in said disk and formed with said threaded holes and said abutments, means in said recesses positioned identically relative to the plane of rotation of said disk for locating the cartridges in accurate positions in the recesses, and means on the cartridges cooperable with said locating means to hold the cartridges in the recesses.

12. A cutting tool as defined in claim 8 in which each of said inserts comprises a generally rectangular block of cutting material, the hole of each insert extending through opposite sides thereof and being located centrally with respect to said cutting faces and with respect to opposite parallel side faces disposed perpendicular to said cutting faces, said ribs and grooves being formed across each of the sides of the block and extending transversely of the axis of the hole and generally parallel to said side faces from one of said cutting faces to the other of said cutting faces whereby scalloped cutting edges are formed at all four junctions of said sides and said cutting faces.

13. A cutting tool as defined in claim 6 in which each of the two platforms supporting the side cutters of each set are located in the same angular position around said disk, at least a portion of the cutting edge of one of said side cutters extending generally radially and being offset laterally in one direction from the cutting edge of said insert and at least a portion of the cutting edge of the other of said side cutters extending generally radially and being offset laterally in the opposite direction from the cutting edge of said insert.

14. A cutting tool as defined in claim 13 in which the two platforms for each pair of side cutters are formed on a single cartridge fastened to said disk.

15. In a cutting tool, the combination of, a disk rotatable about an axis and having a plurality of angularly spaced sets of angularly spaced insert supporting platforms around its periphery, generally flat inserts resting on at least certain ones of the platforms of each set, said inserts all being identical and each having a scalloped leading cutting edge defined by alternating ribs and grooves spaced from one another along said axis and extending generally tangentially of said disk, and means supporting adjacent ones of the inserts of each set on said platforms in different physical positions along said axis thereby to axially stagger the ribs of each insert relative to the ribs of the immediately succeeding insert.

16. A cutting tool as defined in claim 15 including a threaded hole formed in each of the insert-supporting platforms, a centrally located hole formed in each of said inserts, a screw extending through the hole in each insert and threaded into the hole of the respective platform to anchor the insert to the platform, and the holes in adjacent platforms being spaced from one another along said axis to locate adjacent inserts in different physical positions along the axis and thereby effect axial staggering of said ribs.

17. A cutting tool as defined in claim 16 in which each of said inserts comprises a generally rectangular block of cutting material, the hole of each insert extending through opposite sides thereof and being located centrally with respect to opposite parallel end faces and with respect to opposite parallel side faces disposed perpendicular to said end faces, said ribs and grooves being formed across each of the sides of the block and extending transversely of the axis of the hole and generally parallel to said side faces from one of said end faces to the other of said ends faces whereby scalloped cutting edges are formed along all four junctions of said sides and said end faces.

18. An indexable cutting insert comprising a generally rectangular block of cutting material having a hole extending through opposite sides thereof, the axis of said hole being disposed generally perpendicular to said sides and substantially paralleling opposite parallel side faces of the block and opposite parallel end faces disposed perpendicular to said side faces, and alternating ribs and grooves formed across each of said sides and extending transversely of said axis and generally parallel to said side faces from one of said end faces to the other of said end faces thereby to define scalloped cutting edges along the four junctions of said end faces with said sides.

19. An indexable cutting insert as defined in claim 18 in which the crests of each opposing pair of ribs on opposite sides of said block are disposed in a plane extending perpendicular to said sides.

20. A cutting tool for removing metal from a workpiece and comprising, in combination, a rotary body having a plurality of angularly spaced sets of angularly spaced platforms around its periphery, a scalloped insert supported on one platform of each set, each of said scalloped inserts comprising a generally rectangular block of cutting material having a pair of comparatively wide opposite sides and having two parallel end faces narrower than and extending generally perpendicular to said sides, a plurality of alternating ribs and intervening grooves formed across each of said sides from one of said end faces to the other of said end faces thereby to provide scalloped cutting edges along the four junctions of said end faces with said sides, each of said cutting edges, when in active cutting position, being operable to remove laterally spaced chips from said workpiece, and an additional insert supported on another platform of each set and having a cutting edge extending in the same general direction as said scalloped cutting edge for removing material left on said workpiece between the ribs of the scalloped insert.

* * * * *